(12) United States Patent
Messner et al.

(10) Patent No.: US 11,236,024 B2
(45) Date of Patent: Feb. 1, 2022

(54) METHOD OF METALLIZING FERRITE CERAMICS AND COMPONENT COMPRISING A METALLIZED FERRITE CERAMIC

(71) Applicant: Würth Elektronik eiSos GmbH & Co. KG, Waldenburg (DE)

(72) Inventors: Patrick Messner, Göggingen (DE); Florian Roider, Lappersdorf (DE); Steffen Ziegler, Weinsberg (DE)

(73) Assignee: WÜRTH ELEKTRONIK EISOS GMBH & CO. KG, Waldenburg (DE)

( * ) Notice: Subject to any disclaimer, the term of this patent is extended or adjusted under 35 U.S.C. 154(b) by 131 days.

(21) Appl. No.: 16/339,203

(22) PCT Filed: Oct. 11, 2017

(86) PCT No.: PCT/EP2017/075888
§ 371 (c)(1),
(2) Date: Apr. 3, 2019

(87) PCT Pub. No.: WO2018/069370
PCT Pub. Date: Apr. 19, 2018

(65) Prior Publication Data
US 2019/0233342 A1  Aug. 1, 2019

(30) Foreign Application Priority Data
Oct. 14, 2016  (DE) ...................... 10 2016 220 082.8

(51) Int. Cl.
C04B 41/51  (2006.01)
C04B 41/90  (2006.01)
(Continued)

(52) U.S. Cl.
CPC ............ C04B 41/5127 (2013.01); B23K 1/00 (2013.01); C04B 35/26 (2013.01); C04B 37/021 (2013.01);
(Continued)

(58) Field of Classification Search
CPC ... C04B 41/5127; C04B 41/009; C04B 41/52; C04B 41/88; C04B 35/26; C04B 37/021; C04B 2237/34; C04B 2237/525
See application file for complete search history.

(56) References Cited

U.S. PATENT DOCUMENTS 4,860,939 A * 8/1989 Guinet ................ H01L 21/4839
228/122.1
4,935,055 A 6/1990 Aghajanian et al.
(Continued)

FOREIGN PATENT DOCUMENTS

AT 202056 6/2001
CN 87100186 A 8/1987
(Continued)

OTHER PUBLICATIONS

Bib Data and Translation; JP-01129501-A; Okada, Takao; May 1989 (Year: 1989).*

*Primary Examiner* — Alex B Efta
(74) *Attorney, Agent, or Firm* — Boyle Fredrickson, S.C.

(57) ABSTRACT

The invention relates to a process for metallizing ferrite ceramics, which comprises the following steps: arrangement of a contact element composed of copper or a copper alloy on a surface of the ferrite ceramic, melting of the contact element at least in the region in which the contact element contacts the surface of the ferrite ceramic, and cooling of the contact element and the ferrite ceramic to below the melting point of copper or the copper alloy.

7 Claims, 1 Drawing Sheet

(51) Int. Cl.
*C04B 41/00* (2006.01)
*C04B 41/52* (2006.01)
*C04B 35/26* (2006.01)
*H01F 17/04* (2006.01)
*H01F 27/29* (2006.01)
*C04B 41/88* (2006.01)
*C04B 37/02* (2006.01)
*C09J 7/38* (2018.01)
*B23K 1/00* (2006.01)
*C04B 111/00* (2006.01)
*C08K 9/00* (2006.01)
*C08K 7/14* (2006.01)
*H01F 1/34* (2006.01)

(52) U.S. Cl.
CPC ............ *C04B 41/009* (2013.01); *C04B 41/52* (2013.01); *C04B 41/88* (2013.01); *C04B 41/90* (2013.01); *C09J 7/38* (2018.01); *H01F 17/045* (2013.01); *H01F 27/292* (2013.01); *C04B 2111/00844* (2013.01); *C04B 2235/3213* (2013.01); *C04B 2235/3232* (2013.01); *C04B 2235/3274* (2013.01); *C04B 2235/3275* (2013.01); *C04B 2235/3279* (2013.01); *C04B 2235/3281* (2013.01); *C04B 2235/3284* (2013.01); *C04B 2235/3294* (2013.01); *C04B 2235/3298* (2013.01); *C04B 2235/3418* (2013.01); *C04B 2235/6562* (2013.01); *C04B 2237/34* (2013.01); *C04B 2237/407* (2013.01); *C04B 2237/525* (2013.01); *C08K 7/14* (2013.01); *C08K 9/00* (2013.01); *C09J 2301/208* (2020.08); *H01F 1/344* (2013.01)

(56) References Cited

U.S. PATENT DOCUMENTS

| | | | |
|---|---|---|---|
| 5,481,778 | A | 1/1996 | Battlogg |
| 5,672,848 | A * | 9/1997 | Komorita ............ H01L 23/3735 174/260 |
| 6,912,130 | B2 | 6/2005 | Osanai et al. |
| 10,000,423 | B1 * | 6/2018 | Spann .................. C04B 37/021 |
| 2005/0145846 | A1 * | 7/2005 | Brandenburger ...... H01L 21/563 257/71 |
| 2007/0138710 | A1 * | 6/2007 | Fukuyama ............ C04B 41/009 264/648 |
| 2010/0159692 | A1 * | 6/2010 | Swaminathan ...... H05K 3/3436 438/613 |
| 2017/0303404 | A1 * | 10/2017 | Ren ........................ H05K 3/381 |

FOREIGN PATENT DOCUMENTS

| | | | |
|---|---|---|---|
| CN | 1033987 | A | 7/1989 |
| CN | 1497711 | A | 5/2004 |
| CN | 101658968 | A | 3/2010 |
| CN | 105405601 | A | 3/2016 |
| CN | 105679529 | A | 6/2016 |
| CN | 106824728 | A | 6/2017 |
| DE | 2533524 | A1 | 5/1978 |
| DE | 2533524 | C3 | 5/1978 |
| JP | 5727985 | A | 2/1982 |
| JP | 01129501 | | 5/1989 |
| JP | 01129501 | A * | 5/1989 |

* cited by examiner

METHOD OF METALLIZING FERRITE CERAMICS AND COMPONENT COMPRISING A METALLIZED FERRITE CERAMIC

FIELD OF THE INVENTION

The invention relates to a process for metallizing ferrite ceramics. The invention also relates to a component comprising a ferrite ceramic.

BACKGROUND

In inductive components, use is frequently made of magnetic ceramics, for example ferrites. The inductivity and the frequency behavior of such components can be significantly influenced thereby. The magnetic ceramic or ferrite ceramic also determines, inter alia, whether the component can be utilized for storage applications, for example switching regulators, or for suppressing electromagnetic interference. Since the magnetic ceramic is an essential part of the complete component, it is often also used for structural purposes, i.e. to give the component mechanical stability and, for example, take up a winding. In order to be able to join a wire winding of the inductive component to a circuit board, wire pins of flat solder pads are generally used. These can be applied either to a third component such as a support plate composed of metal, known as a lead frame, and/or plastic base or directly to the magnetic ceramic. Direct metallization of the magnetic ceramic is effected, for example, by coating with a thick film paste which usually contains a noble metal such as silver as main constituent. Further constituents of the paste are a glass frit and various organic constituents for establishing processability. As a result of a heat treatment, also referred to as baking, subsequent to coating with the thick film paste, the glass frit bonds to the ferrite ceramic. Electrical conductivity is achieved by means of the metal particles which are fixed by the glass network. If the metallic component of the thick film paste is pure silver, an electrochemical diffusion barrier layer composed of nickel and also a coating composed of tin have to be applied in order for the solder pad to be able to be used for lead-free solder. Metallization using such a process accordingly requires various process steps and also an electrochemical process and therefore causes a high water consumption and poses a risk to the environment due to the chemicals used. The metallizing material silver is also a significant cost factor. There have been efforts to replace the silver paste by, for example, copper paste or other base and therefore cheaper metals. However, in contrast to silver, these require baking under an atmosphere having a reduced oxygen content since otherwise the metal would oxidize. However, if the ferrite ceramic is heated under protective gas or a reducing atmosphere, reduction of the magnetic ceramic occurs, as a result of which the magnetic properties of the ferrite ceramic are adversely affected.

AT 202 056 B discloses a method of joining ceramic objects to one another by means of metal melt fluxes which bind directly to the ceramic surface. This is carried out using a mixture which consists predominantly of finely divided silver/silver oxide and has a small proportion of copper/copper oxide.

DE 25 33 524 C3 discloses a process for producing a coating of copper or of a copper alloy on ferrites. Here, heating is carried out in such a way that no liquid phases occur.

It is an object of the invention to provide an improved process for metallizing ferrite ceramics and an improved component comprising a ferrite ceramic.

SUMMARY

To achieve this object, the invention provides a process for metallizing ferrite ceramics, which comprises the following steps: arrangement of a contact element composed of copper or a copper alloy on a surface of the ferrite ceramic, melting of the contact element at least in the region in which the contact element contacts the surface of the ferrite ceramic, and cooling of the contact element and the ferrite ceramic to below the melting point of copper or the copper alloy.

Reliable metallization of the surface of the ferrite ceramic can be achieved by simple melting of a contact element composed of copper or a copper alloy on a surface of the ferrite ceramic. Here, a thick film paste and the baking thereof and also an electrochemical process are dispensed with. Bonding between the contact element composed of copper or a copper alloy and the ferrite ceramic is effected by heating the copper to a temperature above the melting point. The beads of molten copper or copper alloy which are then formed undergo a reaction with the ferrite ceramic. A layer of copper and copper oxide is formed in a transition layer between the ferrite ceramic and the copper or the copper alloy. Very reliable bonding of the contact element to the ferrite ceramic is achieved by means of this transition layer.

After cooling of the contact element, metallization composed of copper or a copper alloy is then available and soldering can be carried out directly thereon. In this way, reliable joining of the contact element to a winding wire or, for example, also a conductor track of a circuit board is made possible. Since the joining of the contact element to the ferrite ceramic is carried out by simple heating and melting of the contact element, a very environmentally friendly metallization process can be realized. Joining of the contact element to the ferrite ceramic is carried out without application of force, i.e. without an additional force to press the contact element onto the ferrite ceramic.

In an embodiment of the invention, the contact element is completely melted and is present in a droplet-like manner in the molten state on the surface of the ferrite ceramic.

Consequently, the molten contact element rests merely under the force of gravity on the ferrite ceramic during the metallization process. The ferrite ceramic is advantageously provided with a depression in order to accommodate the welding bead of molten copper which is formed by the contact element and reliably keep it in the intended position.

In an embodiment of the invention, the ferrite ceramic is preheated to a temperature in the range from 300° C. to 600° C., in particular from 300° C. to 400° C., before the contact element is melted on.

Such preheating of the ferrite ceramic assists the formation of a bond between the contact element and the ferrite ceramic, which is effected by formation of a transition layer composed of copper and copper oxide or of the copper alloy and copper oxide. The preheating of the ferrite ceramic also prevents the formation of stress cracks in the ferrite ceramic.

In an embodiment of the invention, the ferrite ceramic is preheated at a heating rate in the range from 80 K/min to 150 K/min.

In this way, short process times can be combined with gentle heating of the ferrite ceramic.

In an embodiment of the invention, the accessible surface of the contact element is coated with a layer of tin, after the contact element has been joined to the ferrite ceramic.

Application of a layer of tin assists, for example, the subsequent contacting of the contact element, for example with an end of the winding of a coil or a conductor track on a circuit board.

In an embodiment of the invention, the contact element is ground after the contact element has been joined to the ferrite ceramic.

A grinding process can, for example, produce a flat surface and at the same time also a metallically clean surface, which is advantageous for subsequent processing steps.

In an embodiment of the invention, the cooling of the ferrite ceramic and the contact element is effected by means of natural convection.

In this way, stress cracks in the ferrite ceramic are prevented and cooling can also be carried out in an environmentally friendly way.

The problem addressed by the invention is also solved by a component comprising a ferrite ceramic and at least one contact element composed of copper or a copper alloy, wherein the contact element is joined to the ferrite ceramic and a transition layer composed of copper and copper oxide or the copper alloy and copper oxide is arranged in the transition region between a surface of the ferrite ceramic and the contact element.

Such a transition layer between the material of the contact element and the ferrite ceramic ensures reliable bonding of the ferrite ceramic and the material of the contact element. It is particularly advantageous here that the reliable bonding of the contact element to the ferrite ceramic is obtained by simple melting of the contact element while it is resting on the ferrite ceramic.

In an embodiment of the invention, the ferrite ceramic contains iron oxide ($Fe_3O_4$) as main constituent. In an embodiment of the invention, the ferrite ceramic additionally contains oxides of the elements manganese (Mn), nickel (Ni), copper (Cu), bismuth (Bi), silicon (Si), cobalt (Co), strontium (Sr), barium (Ba), titanium (Ti), zinc (Zn) and/or antimony (Sb) in addition to the main constituent iron oxide.

In an embodiment of the invention, the ferrite ceramic has at least one depression for accommodating the contact element, at least in sections.

In a depression which is advantageously matched to the volume of the contact element, the contact element can be kept reliably in the intended position before melting and especially after melting. After melting, the contact element is present in the form of a molten bead on the ferrite ceramic and the presence of a depression on the ferrite ceramic assists the positioning of this molten bead considerably.

BRIEF DESCRIPTION OF THE DRAWINGS

Further features and advantages of the invention may be derived from the claims and the following description of preferred embodiments of the invention in combination with the drawings. Individual features of the various embodiments depicted and described can be combined with one another in any way without going outside the scope of the invention. The drawings show:

DETAILED DESCRIPTION

Figure 1:
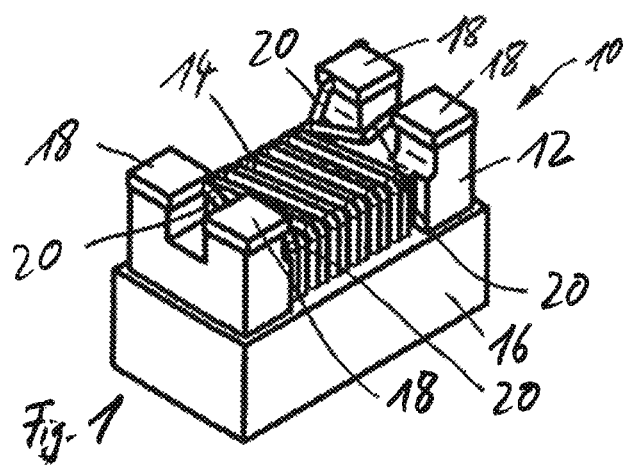
FIG. 1 a view obliquely from below of a component according to the invention.

FIG. 1 shows a component 10 according to the invention which is configured as inductive component and has a core 12 composed of ferrite ceramic and two wire windings 14 located on the core 12. A lower section 16 of the component 10 in FIG. 1 is formed by an embedding composition and, as can be seen, accommodates sections of the core 12 and also sections of the windings 14.

The core 12 has four projections at the free ends of which contact elements 18 are arranged in each case. The contact elements 18 consist of copper or a copper alloy and are intended to establish an electrically conductive connection to conductor tracks or solder pads of a circuit board when the component 10 is placed with its underside shown at the top in FIG. 1 on the circuit board.

In addition, the ends 20 of the windings 14 are joined to the contact elements 18. The windings likewise consist, for example, of copper wire.

During production of the component 10, the core 12 of ferrite ceramic is produced and the windings 14 are subsequently installed. In a further step, the free ends of the projections of the core 12 are metallized by applying the contact elements 18, which can occur either before or after installation of the windings. In the process of the invention, this is carried out by placing the contact elements, for example in the form of a piece of copper wire, on the free ends, shown at the top in FIG. 1, of the projections of the core 12 and then heating them until the contact elements, in other words the pieces of copper wire, melt and form molten beads on the ferrite ceramic of the core 12. The molten heads are kept on the upper side of the projections solely by the force of gravity on them.

Figure 2:
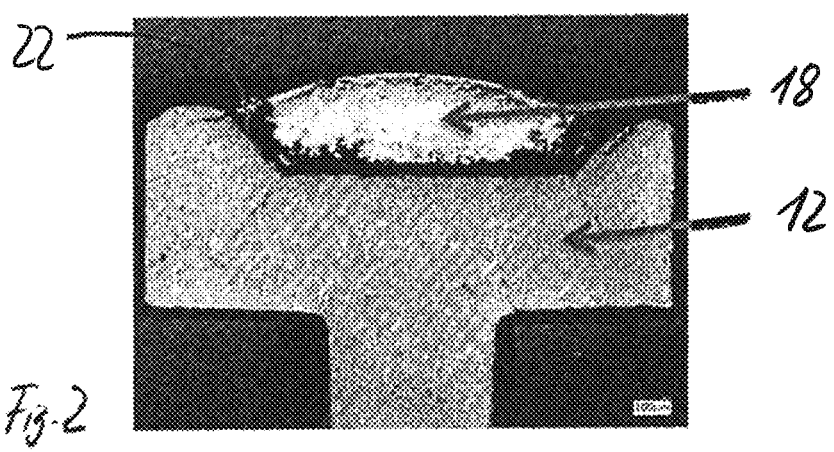
FIG. 2 an optical micrograph of the cut joining region between a contact element and the ferrite ceramic of the component of FIG. 1, and FIG. 3 a BSE (backscattered electrons) image of the transition region between the ferrite ceramic and the contact element in FIG. 2.

The end faces at the top of the projections of the core 12 are advantageously provided with a depression, see also FIG. 2, in order to keep the molten beads reliably in the intended position.

In the molten state of the contact elements 18, a bond is formed between the copper or the copper alloy of the contact elements 18 and the ferrite ceramic of the core 12. In the cooled state, a transition layer composed of copper and copper oxide is present between the ferrite ceramic of the core 12 and the copper or the copper alloy of the contact element 18. A reliable mechanical bond between the contact elements 18 and the ferrite ceramic of the core 12 is established via this transition layer.

In the process of the invention, a bond between the ends 20 of the windings and the contact elements 18 can also be formed simultaneously with the melting of the contact elements 18. For example, the ends 20 of the windings, which consist of copper wire, are simply brought into contact with the molten beads formed and thereby then form a mechanically stable and electrically conductive bond to the contact elements 18. In the same way, the subsequent soldering or welding of the ends 20 of the windings onto the contact elements 18 which have then cooled again is also possible, for example, according to the invention.

After cooling of the contact elements 18, these can be additionally ground in order to produce a metallically pure surface and/or provided with a tin coating in order to make the component 10 storable for a long time and also to assist a soldered join between the contact elements 18 and conductor tracks or solder pads of a circuit board.

The picture of FIG. 2 shows an optical micrograph of a section through the core 12 in the region of one of the contact elements.

A sectional view through one of the upward-pointing projections of the core 12 composed of ferrite ceramic and one of the contact elements 18 is shown. It can be seen that depressions 22 are provided in the upper sides of the projections of the core 12; these depressions can then accommodate the molten beads formed by the contact elements and keep them reliably in position in the molten state thereof. It can be seen that the depression has a flat bottom and sides arranged obliquely to the bottom. Bonding between the contact element 18 and the surfaces of the depression 22 occurs both on the flat bottom and also in the region of the oblique side faces opening in the direction of the opening of the depression.

The depiction in FIG. 2 shows the state of the contact element 18 after cooling from the molten state. The contact element 18 can be additionally ground starting from the state depicted in FIG. 2, for example in order to produce a flat contact surface.

Figure 3:
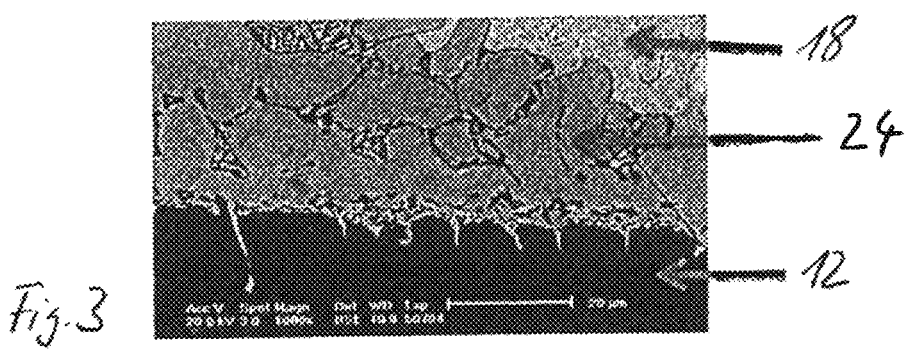

The depiction in FIG. 3 shows a more greatly enlarged depiction of the transition region between a contact element 18 and the ferrite ceramic of the core 12. The depiction of FIG. 3 is a BSE (backscattered electrons) image which has been produced by means of a scanning electron microscope and is also referred to as material contrast image. It can be seen that the ferrite ceramic of the core 12 is shown in black in FIG. 3. Going upward from the ferrite ceramic 12, there is a transition layer 24 which consists of copper and copper oxide. It can readily be seen that this transition layer 24 is also mechanically intermeshed with the ferrite ceramic of the core 12.

The transition layer 24 is then followed by the somewhat lighter-colored material of the contact element 18, i.e. copper or a copper alloy. Mechanical intermeshing can also be seen between the transition layer 24 and the material of the contact element 18.

The bond between the contact element 18 or the molten bead of the material of the contact element 18 and the ferrite ceramic of the core 12 is formed by reaction of the molten copper or the molten copper alloy in the molten bead with the ferrite ceramic of the core 12. After cooling, when the contact element is in the solid state, the contact element 18 is then reliably joined to the ferrite ceramic of the core 12.

The invention claimed is:

1. A process for metallizing ferrite ceramics, which comprises the following steps:
    arrangement of a contact element composed of copper or a copper alloy on a surface of the ferrite ceramic,
    melting of the contact element at least in the region in which the contact element contacts the surface of the ferrite ceramic, and
    cooling of the contact element and the ferrite ceramic to below the melting point of copper or the copper alloy,
    wherein the contact element is completely melted and rests in a droplet-like manner in the molten state on the surface of the ferrite ceramic.

2. The process as claimed in claim 1, wherein the ferrite ceramic is preheated to a temperature in a range from 300° C. to 600° C. before melting of the contact element.

3. The process as claimed in claim 2, wherein the ferrite ceramic is preheated at a heating rate in the range from 80 kelvin to 150 kelvin per minute.

4. The process as claimed in claim 1, wherein joining of a wire of a winding or connecting wire to the contact element occurs simultaneously with the melting of the contact element.

5. The process as claimed in claim 1, further including coating of an accessible surface of the contact element with a layer of tin after the contact element has been joined to the ferrite ceramic.

6. The process as claimed in claim 1, further including grinding of the contact element after the contact element has been joined to the ferrite ceramic.

7. The process as claimed in claim 1, wherein the cooling of the ferrite ceramic and of the contact element occurs by means of natural convection.

\* \* \* \* \*